(12) United States Patent
Ludwig et al.

(10) Patent No.: US 12,727,712 B2
(45) Date of Patent: Sep. 8, 2026

(54) KITCHEN APPLIANCE WITH CHARGE CONTROL OF AN AUXILIARY DEVICE

(71) Applicant: VORWERK & CO. INTERHOLDING GMBH, Wuppertal (DE)

(72) Inventors: Matthias Ludwig, Mettmann (DE); Mirco Pieper, Wuppertal (DE)

(73) Assignee: VORWERK & CO. INTERHOLDING GMBH (DE)

( * ) Notice: Subject to any disclaimer, the term of this patent is extended or adjusted under 35 U.S.C. 154(b) by 1166 days.

(21) Appl. No.: 17/524,268

(22) Filed: Nov. 11, 2021

(65) Prior Publication Data

US 2022/0142399 A1 May 12, 2022

(30) Foreign Application Priority Data

Nov. 11, 2020 (DE) ......................... 102020214196.7

(51) Int. Cl.
*A47J 36/32* (2006.01)
*A47J 27/00* (2006.01)
*A47J 43/046* (2006.01)

(52) U.S. Cl.
CPC ............. *A47J 36/32* (2013.01); *A47J 27/004* (2013.01); *A47J 43/046* (2013.01); *A47J 2202/00* (2013.01)

(58) Field of Classification Search
CPC ........ A47J 36/321; A47J 27/004; A47J 36/00; A47J 36/32; A47J 37/0786; A47J 2043/0733; A47J 2201/00; A47J 2202/00; A47J 2203/00; A47J 27/002; A47J 27/04; A47J 27/10; A47J 27/18; A47J 27/21058; A47J 27/212; A47J 27/62; A47J 36/06; A47J 36/2405; A47J 37/0629; A47J 37/0664; A47J 43/0716; A47J 45/068
USPC ....... 219/494, 435, 497, 392, 431, 441, 442, 219/492, 495, 501, 704, 712, 713; 99/324, 325, 330, 331, 332, 333, 342, 99/344
See application file for complete search history.

(56) References Cited

U.S. PATENT DOCUMENTS

2015/0208858 A1* 7/2015 Robbins ................ A47J 27/002 426/231
2016/0238459 A1 8/2016 Koetz et al.
(Continued)

FOREIGN PATENT DOCUMENTS

DE 3045143 7/1982
DE 20200419 U1 5/2002
(Continued)

OTHER PUBLICATIONS

Search Report issued to EP 21203437.5 mailed Apr. 27, 2022 (5 pages).
(Continued)

*Primary Examiner* — Chris Q Liu
(74) *Attorney, Agent, or Firm* — Barnes & Thornburg

(57) ABSTRACT

A system includes a kitchen appliance for preparing food and a battery-operated auxiliary device. The kitchen appliance includes a food preparation vessel for receiving the food to be prepared therein. The kitchen appliance includes a tool for mixing or comminuting the food in the food preparation vessel and/or a heating element for heating the food in the food preparation vessel.

18 Claims, 1 Drawing Sheet

(56) References Cited

U.S. PATENT DOCUMENTS

| | | | | |
|---|---|---|---|---|
| 2017/0138797 | A1* | 5/2017 | Brown | G01K 1/14 |
| 2018/0301900 | A1* | 10/2018 | Geng | H02J 3/14 |
| 2020/0141813 | A1 | 5/2020 | Nivala et al. | |
| 2020/0281391 | A1* | 9/2020 | Swayne | A23L 5/17 |
| 2022/0210874 | A1* | 6/2022 | Kikuchi | H05B 6/062 |
| 2022/0325897 | A1* | 10/2022 | Frielinghaus | F24C 7/087 |

FOREIGN PATENT DOCUMENTS

| | | | |
|---|---|---|---|
| EP | 3056882 | | 8/2016 |
| EP | 3420864 | A1 | 1/2019 |
| WO | 2019012324 | A1 | 1/2019 |

OTHER PUBLICATIONS

Office Action issued to DE102020214196A1 mailed May 11, 2022 (8 pages).

First Office Action for Application No. 202111328741.9, dated Dec. 6, 2025, 10 pages.

* cited by examiner

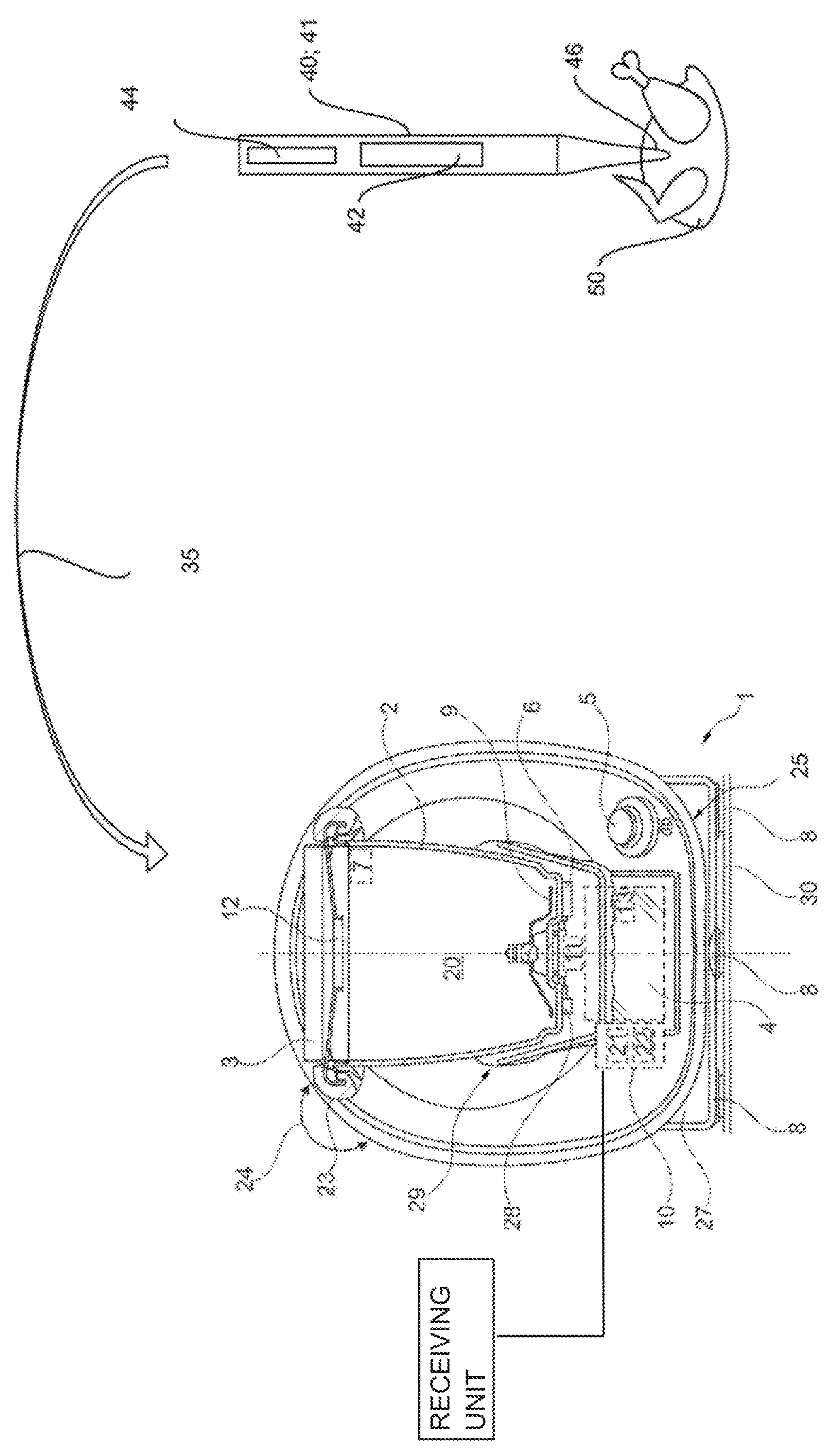
44
40; 41
46
42
50
35
1
2
9
6
5
25
8
30
4
12
3
20
24
23
29
28
10
27
RECEIVING UNIT

KITCHEN APPLIANCE WITH CHARGE CONTROL OF AN AUXILIARY DEVICE

CROSS-REFERENCE TO RELATED APPLICATION

This application claims priority to and benefit of German Patent Application 102020214196, filed Nov. 11, 2020, the disclosure of which is hereby incorporated in its entirety by reference herein.

TECHNICAL FIELD

The systems and methods of the present disclosure are generally directed to a kitchen appliance for preparing food in a food preparation vessel.

BACKGROUND

Domestic kitchen appliances, such as the Thermomix®, may be configured to access digitally stored recipes for the semi-automated preparation of a dish. To prepare a dish, a user successively proceeds through the recipe steps in the sequence as specified by the recipe. Especially in the case of high-quality kitchen appliances, the user expects that he or she will achieve a reproducible cooking result of high quality by means of the kitchen appliance.

Together with an auxiliary device such as a thermometer, a household stirring device or an oven, a kitchen appliance can prepare food. An example thereof is described in the non-prepublished European patent application with the official file number 20175328.2. A suitably configured kitchen appliance can be linked data-wise to a correspondingly configured auxiliary device, such as a household stirring device as defined in the aforementioned European patent application, in order to use information from the auxiliary device to prepare the food or to control the auxiliary device.

SUMMARY

A kitchen appliance for preparing food in a food preparation vessel is used to solve the problem. The kitchen appliance has a tool for mixing or comminuting the food in the food preparation vessel and/or a heating element for heating the food in the food preparation vessel. The kitchen appliance is configured to receive a status information regarding a food preparation from a battery-operated auxiliary device and to use the status information for a food preparation process. The kitchen appliance has a receiving unit for receiving a charging status of the battery-operated auxiliary device, and a control unit for processing the received charging status.

This enables a reproducible result of the food preparation. It has been recognized that the charging status is an essential adjusting screw to ensure the orderly course of food preparation. A failure of an auxiliary device can lead to an impairment of the result of the food preparation. For this reason, to ensure a reproducible result of the food preparation process, it is ensured that the charging status is included in the food preparation process. In particular, appropriate measures may be taken on the basis of the charging status in order to be able to continue the food preparation process as undisturbed as possible. Such measures may, for example, be charging of the auxiliary device and/or a modification of a planned food preparation process.

A process for the preparation of food is an operation carried out by a functional component of the kitchen appliance or of another appliance, in which food is processed. Examples of processes for preparing food are stirring, comminuting, heating in the food preparation vessel or heating by means of another appliance, for example an oven, a microwave or a grill. A functional component is a technical unit that can be operated electrically to operate an appliance and/or to carry out a process. In particular, functional components for carrying out processes for the preparation of food are meant. The kitchen appliance comprises as functional components, for example, a drive of the tool and/or the heating element. Functional components of the further appliance may also be a tool for mixing and/or comminuting food or a heating element for heating the food.

The kitchen appliance is configured to perform a food preparation process by mixing, comminuting, and/or heating the food in the food preparation vessel. Liquids, beverages, ingredients of food, unprocessed or partially processed ingredients or mixtures thereof are encompassed by the term food as used according to the present disclosure.

A food preparation process is a process in which a food is processed. A food preparation process may include preparing food in the preparation vessel. A food preparation process may be performed with the tool and/or the heating element and/or comprise individual processes. A food preparation process may comprise processes performed in or using at least one further appliance. In particular, a further appliance means an external appliance such as, for example, a further kitchen appliance, a household stirring appliance as defined in European patent application with official file number 20175328.2, an oven, a microwave or a thermometer. A food preparation process may comprise processes performed with, for example, an oven or a grill. A food preparation process may comprise using the auxiliary device. A food preparation process may comprise preparing several foods by the kitchen appliance and/or in another appliance. Information from functional components of the kitchen appliance and/or information received from further appliances may be used to perform a food preparation process. A food preparation operation may comprise outputs to the user, such as displays and/or notifications. For example, the visual display of step-by-step instructions may be comprised, by means of which the user is guided through a recipe step-by-step during the food preparation process.

In the following, embodiments of the present disclosure are also explained in more detail with reference to a FIGURE. Features of the exemplary embodiment may be combined individually or in a plurality with the claimed subject matter, unless otherwise indicated. The claimed scope of protection is not limited to the exemplary embodiments.

BRIEF DESCRIPTION OF THE DRAWINGS

FIG. 1 is a diagramatic representation of a kitchen appliance according to the present disclosure.

DETAILED DESCRIPTION

FIG. 1 shows a kitchen appliance 1 for performing a food preparation process in a food preparation vessel 2. A heating element 6 may be provided for heating the food 20. For comminuting and/or mixing the food 20, a rotatable tool 9 may be provided which is coupled to a drive 11 via a shaft which is not shown, in particular through an opening in the bottom of the food preparation vessel 2. A housing 27 of the kitchen appliance encloses the drive 11 and provides a receptacle 29 for the food preparation vessel 2. The kitchen appliance 1 has a control unit 10 for controlling the functional components such as heating element 6 or tool 9 or drive 11, respectively, in particular based on recipe steps of a recipe. Measuring sensors for detecting an operating condition, such as a temperature sensor 28, may be provided. The control unit 10 may have a processor 21 and a memory 22. Weight sensors 8 may be disposed in the feet of the kitchen appliance 1, through which the housing 27 rests on a base 30. A contact sensor 7 may be disposed on the food preparation vessel 2 or lid 3.

A lid 3 may be provided for closing the food preparation vessel 2. The lid may have a locking device 23. By means of a pivoting movement 24, it is possible to switch between a locked and unlocked state. The lid 3 may include a lid opening 12 for adding ingredients or food, respectively, into the food preparation vessel 2 that is mainly covered by the lid 3.

Via a user interface 24, comprising in particular a touch-screen display 4 and/or a button 5, the user can receive information and instructions from the control unit 10 and make inputs for the control unit 10. The user interface 24 thus serves as an input unit as well as an output unit. Preferably, the control unit 10 has access to recipes having several recipe steps that can be put into practice by the user and the kitchen appliance 1 using the user interface 24 to prepare a food 20. For this purpose, the kitchen appliance 1 is configured to output information to a user based on the recipe steps of the recipe by means of the user interface 24. Based on one or more operating parameters, the control unit 10 ensures that a food 20 is heated, comminuted and/or mixed in the food preparation vessel 2 in a desired manner. In this way, the food preparation process can be controlled and/or monitored.

On the right side, an auxiliary device 40, namely a wireless thermometer 41, is shown schematically. The thermometer 41 serves the monitoring of the temperature inside a food 50 to be prepared, which here is exemplarily represented as a grilled chicken. The thermometer 41 is configured such that its tip 46 is disposed inside the chicken and monitors the internal meat temperature inside during grilling the chicken. The thermometer 41 further comprises (not shown) a temperature sensor disposed in the region of the tip 46, and a transducer for generating an electrical signal in response to the detected temperature.

The thermometer 41 comprises a battery 42 for supplying power to the electrical and/or electronic components. The thermometer 41 comprises a sending unit 44, for sending information by radio. With the sending unit 44, signals regarding a status information concerning a food preparation are sent, namely information regarding the measured temperature. The sending unit 44 is further used to send information regarding the charging status of the battery 42. The sending unit 44 may, for example, be configured to send signals by means of Bluetooth.

A second temperature sensor may be provided in the upper half of the thermometer, for example between the battery 42 shown in FIG. 1 and the sending unit 44 shown in FIG. 1.

The battery 42 may be provided in the middle of the thermometer 41 as shown in FIG. 1. However, the battery 42 may also advantageously be provided at the tip 46 of the thermometer 41. If the tip 46, i.e. the pointed end of the thermometer 41, is inserted into a food, then the battery 42 is thereby protected from excessive heat.

A data-wise connection 35 for transmitting this information from the auxiliary device 40 to the kitchen appliance 1 is shown schematically with an arrow. The kitchen appliance 1 has a receiving unit (not shown) which is configured to receive the information regarding the measured temperature and regarding the charging status of the battery 44 of the auxiliary device 40 transmitted by means of the connection 35.

The kitchen appliance 1 is configured to receive the status information as well as the charging status of the battery-operated auxiliary device 40. The kitchen appliance 1 is further configured to process the received information regarding the charging status by means of the control unit 10. By means of the control unit 10, for example, a remaining period of use of the thermometer 41 can be determined and/or it can be determined whether the recipe can be completely processed with the current charging status of the thermometer 41. If this is not the case or if complete processing of the recipe cannot be ensured, a corresponding information can be output to the user by means of the user interface 24. In this case, start times of future processes, for example following recipe steps, can also be adjusted. In particular, the start times can be postponed so that the battery 42 can be sufficiently charged by the start of the respective process to ensure complete processing of the recipe.

Before or at the beginning of a food preparation process, it is possible to indicate which devices are required, for example the auxiliary device 40, by means of the user interface 24. Once the charging status has been received, the remaining period of use can be displayed. If a recipe is selected by the user, it may be indicated whether the recipe can be fully processed with the charging status of the auxiliary device 40. If not, it is possible to display how long the auxiliary device needs to be charged first so that the recipe can be prepared subsequently. Alternative or modified recipes can also be displayed or proposed.

A recipe can refer to the preparation of one food such as for example the preparation of a soup. A recipe, however, can also cover the preparation of several foods such as, for example, several foods for a main course. A first food of a main course may be risotto. A second dish of a main course may be salad. A recipe may relate to the preparation of a set menu comprising a plurality of foods such as an starter, a main course, and a dessert. The starter may be a soup. The main course may be risotto. The dessert may be zabaglione.

The recipe can be stored digitally. If a recipe comprises the preparation of several foods, digitally stored recipes for the several foods can be combined into one recipe, for example by a control unit. If the recipe combined in this way is processed, recipe steps are thus processed one after the other. The consequence of the processing is that a plurality of foods is prepared. The recipe may have been combined in such a way that several foods are completed at the same time or at least substantially at the same time.

The kitchen appliance may comprise a heating element for heating food in the food preparation vessel, which for example may be arranged at and/or in the bottom of the food preparation vessel. In particular, an electric heating element is meant. Preferably, a revolvable tool, which is in particular arranged or arrangeable in the bottom section of the food preparation vessel, is used for comminuting and/or mixing. The tool and the heating element are electrically operable functional components for preparing food in the food preparation vessel. The tool can be reversibly connected to a shaft of the kitchen appliance. Preferably, a drive for rotating the tool or the shaft, respectively, is arranged in a housing of the kitchen appliance. In particular, the drive is connected to the tool via a shaft that extends in a sealed manner through an opening in the bottom of the food preparation vessel. Preferably, the tool has at least one blade. The tool may be configured to both mix and comminute the food in the food preparation vessel.

A status information is an information regarding a status of a food, a part of a food, a device or a functional component for food preparation. The status information relates to the food preparation. In particular, a status information is meant which is determined during a food preparation. The status information may comprise, for example, a temperature, a rotational speed, a setting or an operating parameter of an appliance, in particular of the auxiliary device.

Receiving the status information regarding the food preparation is in particular also carried out by means of the receiving unit of the kitchen appliance. It can be a wireless reception. The receiving of status information means the receipt of information concerning the status information. The kitchen appliance is configured to use the status information for a food preparation process. In particular, the control unit of the kitchen appliance processes the status information. The status information can further be displayed or output in another way. For example, it can be shown as a display of the charging status on a display of the kitchen appliance. It may be used to influence control parameters of the food preparation process. These control parameters may concern processes of the kitchen appliance and/or processes of another appliance.

The auxiliary device serves to determine and transmit information regarding the status information. For example, the auxiliary device is a thermometer that measures a temperature in the inside of a food and/or in the inside of a food preparation vessel as status information and transmits the corresponding data wirelessly. It is, however, not excluded that the auxiliary device also has functional components for carrying out a process for preparing a food.

In an embodiment, the thermometer comprises two temperature sensors. There may be a distance between the two temperature sensors. For instance, one temperature sensor may be present at a pointed end of the thermometer. The other temperature sensor may be present at the middle of the thermometer or between the middle of the thermometer and the other end of the thermometer. If the pointed end of the thermometer is pierced into the food, the temperature inside the food can be measured with one temperature sensor and the temperature outside the food with the other temperature sensor, i.e. usually the temperature in the food preparation vessel. Thus, improved reproducible cooking results can be achieved. Both measured temperatures can be used to control the heating of the food preparation vessel.

The auxiliary device is a battery-powered electrical appliance configured to cooperate with the kitchen appliance in a food preparation process. In particular, the auxiliary device is a device separate from the kitchen appliance. It assists the kitchen appliance in the preparation of food. In particular, it is a remote device that can be connected to the kitchen appliance by data technology. In particular, the auxiliary device is of such dimensions that it can be arranged in the oven, and in particular at least partially in the food, during food preparation taking place in an oven. It may be an oven thermometer. The auxiliary device may further be dimensioned such that it can be arranged in the food preparation vessel of the kitchen appliance to monitor the preparation of a food in the food preparation vessel. In this regard, it is not excluded that the auxiliary device partially protrudes from an opening of the food preparation vessel and, if applicable, from a lid opening of a lid of the food preparation vessel.

A battery-operated device is a device which requires an electric current and/or an electric voltage for at least one function and which has at least one battery for supplying the current and/or the voltage. In particular, the battery is required for the acquisition of data relating to the status information and/or for the transmission of these data. The charging status of the battery-powered auxiliary device refers to the charging status of the battery of the auxiliary device. Accordingly, charging the auxiliary device refers to charging the battery of the auxiliary device. Batteries in the sense of the present disclosure are in particular rechargeable batteries. However, non-rechargeable batteries are not excluded as well.

A charging status is an indication of the existing charge of a battery, for example as a relative proportion of a total charging capacity or as an absolute value. Receiving a charging status typically means receiving data containing information regarding the charging status. In other words, the receiving unit serves to receive information regarding the charging status. The receiving unit may be an analogue or a digital receiving unit. The charging status may be information about a remaining or consumed portion of the battery capacity or about a remaining or consumed absolute value of the battery capacity of the auxiliary device.

In particular, the individual processes for food preparation or the food preparation process are controlled by means of the control unit. The received status information regarding the food preparation process can be used by the auxiliary device. The control unit may be configured to control processes of other devices. The control unit can be configured to set operating parameters of individual functional components. In particular, the kitchen appliance is configured to set operating parameters taking into account the status information received from the auxiliary device regarding the food preparation. In other words, the auxiliary device may provide information that influences the food preparation process. For example, the kitchen appliance may be configured to determine the amount of time required until completion of the cooking process based on the temperature measured inside a food.

In an embodiment, the control unit is configured to determine a remaining period of use of the auxiliary device, taking into account the received charging status.

A remaining period of use of the auxiliary device is a period of use that is still possible with a given charging status of the auxiliary device. In particular, a specific indication of time is meant. It is possible that the remaining period of use in the sense of the present disclosure is reduced by an absolute value or a relative proportion compared to the calculated remaining period of use in order to take into account any measurement inaccuracies and to maintain a safety margin.

This embodiment enables that relevant information for using the auxiliary device is available in order to—if required—adjust the food preparation process accordingly. Thus, a failure of the auxiliary device can be prevented and the reproducibility of the food preparation is further increased. In particular, the kitchen appliance is configured to output the remaining period of use to a user. This can be done in particular with an output unit of the kitchen appliance.

In one embodiment, the kitchen appliance is configured to set at least one operating parameter of the tool and/or the heating element based on recipe steps of a recipe. Alternatively or in addition, the kitchen appliance is configured to output at least one information to a user based on recipe steps of a recipe.

In other words, the control unit can access a recipe and be caused by a recipe step of the recipe to operate one of the functional components in a manner defined by the recipe step. Preferably, a recipe comprises several recipe steps. Some of these recipe steps include, in particular, a process such as heating, comminuting and/or mixing a food.

A recipe is a data set that defines several recipe steps. Recipe steps contain one or more control parameters for one or more functional components of the kitchen appliance and/or at least one further appliance. A recipe step in particular contains information about the duration for which each functional component is to be operated in which manner. Control parameters contained in a recipe step may herein be, for example, the temperature, the rotational speed, a duration of time of a processing, a start or end time or a start or end condition of a process for food preparation. In particular, the one control unit is configured to set operating parameters of the functional components using the control parameters stored in the recipe steps of the recipe. In a recipe step, it can be provided that a combination of several processes is carried out. For example, stirring and heating can be carried out simultaneously in the food preparation vessel. Also, several processes can be carried out simultaneously in different devices.

In particular, the control unit is configured to determine and provide operating parameters and/or to initiate the output of information. Information to be output may include a signal, an alarm, an instruction and/or an indication of content relating to a food preparation operation. An information may be output to one of the devices used to prepare food, for example, to the auxiliary device. The device may comprise a display on which the information may then be displayed, for example. An output of information can, for example, alternatively or additionally be made possible by a mobile telephone on which a programme suitable for this purpose, i.e. an "app", has been installed. At least one of the devices used, such as the auxiliary device, can display a status of the auxiliary device. A status indication can, for example, be made via said mobile phone. The status indication may comprise the charging status of the battery of the auxiliary device. The status indication may comprise, for example, the maximum possible operating time of the auxiliary device before the battery of the auxiliary device needs to be recharged for continued operation.

The kitchen appliance may have an output unit. The output unit may be configured for the visual output of information in a form that can be interpreted by the user, for example for the output of instructions for processing recipe steps. Alternatively or additionally, the kitchen appliance may have an output unit for acoustic output of information, such as for example alarm signals and/or notification sounds. The output of information is typically performed by means of the output unit.

Information to be output on the basis of recipe steps in particular relates to the processing of the recipe steps. For example, the output unit is configured to display instructions to the user for manually executing a step or partial step of a recipe. For example, the addition of an ingredient to the food preparation vessel is such an instruction. The addition can either be recognized automatically, for example by means of an integrated scale, or confirmed by the user, for example by means of an input unit. This embodiment enables a particularly reproducible result of the food preparation, since the specification of the operations to be performed reduces individual influences.

In an embodiment, the control unit is configured to determine whether the recipe can be completely processed with the charging status of the auxiliary device.

The control unit determines whether the recipe on which a current food preparation process is based can be completely processed. It is therefore determined whether the current food preparation process can be completed without changes or as planned, respectively. The kitchen appliance is configured, in particular, to output information to the user corresponding to the result of the determination. Typically, the determination whether the recipe can be completely processed with the charging status results in that the recipe can be completely processed with the charging status (positive decision), or that the recipe cannot be completely processed with the charging status (negative decision).

In one embodiment, the control unit can furthermore take into account a risk area in which a positive decision is determined by calculation, but this decision is close to the limit of a negative decision. In this case, the control unit is configured to either also make a negative decision as the result of determining whether the recipe can be completely processed with the charging status or to determine a third result according to which the complete processing of the recipe is critical (risk decision). In particular, the control unit is configured to determine, in the case of a negative decision or a risk decision, that complete processing of the recipe with the charging status of the auxiliary device cannot be guaranteed. In this manner, all cases are taken into account in which complete processing of the recipe with the charging status is not possible or is critical, i.e. cannot be guaranteed. This further increases the reproducibility of the result, since possible measurement errors, inaccuracies of the prediction, deviations from the planned sequence of recipe steps, deviation in quantity and/or quality of food to be prepared and the like are taken into account.

In an embodiment, the kitchen appliance is configured to determine during operation of the auxiliary device and/or in a standby mode or power saving mode of the auxiliary device whether the recipe can be completely processed. In an embodiment, the kitchen appliance is configured to determine during the charging of the auxiliary device whether the recipe can be fully processed.

In particular, the kitchen appliance is configured to determine by the kitchen appliance and, if applicable, the auxiliary device before or at the beginning of a food preparation process whether the recipe can be completely processed with the charging status of the auxiliary device. In this way, an intended food preparation process can be planned in advance, which increases user-friendliness. In an embodiment, the kitchen appliance is configured to determine (again) during the food preparation process and/or after completion of a recipe step whether the recipe can be completely processed with the charging status of the auxiliary device. In this way, any measures can be based on more up-to-date information. Deviations in the determinations carried out at different points in time can be compensated in this way.

In a further embodiment, the control unit is configured to perform one or more of the following steps in order to determine whether the recipe can be completely processed with the charging status of the auxiliary device: The control unit may determine a remaining period of use of the auxiliary device taking into account the received charging status. Alternatively or additionally, the control unit may determine an expected period of use of the auxiliary device. In doing so, the control unit takes into account the digital recipe, for example at least one recipe step, and in particular several or all recipe steps still to be processed. Alternatively or additionally, the control unit can compare a remaining period of use of the auxiliary device with an expected period of use of the auxiliary device.

An expected period of use is a period of use of the auxiliary device that is required to completely prepare the food. In an embodiment, at least one recipe step of the recipe is taken into account to determine the expected period of use of the auxiliary device. In particular, an expected duration of the recipe step or of the recipe steps is taken into account. In an embodiment, the recipe steps for which the auxiliary device is required can be taken into account only or mainly.

For example, information regarding the duration of a future recipe step in which the food is cooked using the auxiliary device is taken into account to determine the required operating time of the auxiliary device. Likewise, several or all of the recipe steps to be processed of the recipe on which the current food preparation process is based can be taken into account. For example, it can be taken into account that an auxiliary device, i.e. an external thermometer, is not required for some subsequent recipe steps and can thus remain in a power saving mode, whereby its charging status is not or only slightly reduced during these recipe steps.

This enables a particularly accurate determination of the expected period of use of the auxiliary device. Taking measures is thus limited to those cases in which it is absolutely necessary. Overall, this enables a reproducible cooking result with a particularly high level of user-friendliness.

The comparison of the remaining period of use of the auxiliary device with the expected period of use of the auxiliary device comprises, for example, a comparison of specific durations of time expressed in minutes. If the expected period of use is longer than the remaining period of use, the recipe cannot be completely processed with the charging status of the auxiliary device anymore.

This embodiment has a low technical effort and is particularly advantageous for an auxiliary device whose energy demand is substantially constant over time, at least temporarily, for example a thermometer.

In an embodiment, the control unit is configured to perform one or more of the following steps in order to determine whether the recipe can be completely processed with the charging status of the auxiliary device: The control unit can determine a charging status of the auxiliary device required for processing the recipe. In doing so, it can take into account at least one recipe step of the recipe, in particular several steps and, for example, all recipe steps still to be processed. Alternatively or additionally, the control unit can determine whether the recipe can be completely processed and/or whether complete processing of the recipe can be guaranteed. In doing so, it can take into account the received charging status of the auxiliary device and the required charging status of the auxiliary device. In other words, the determination herein is not based on expected and remaining durations of use, i.e. time spans, but based on required and actual charging statuses. Likewise, present and required energy quantities can be taken as a basis. This is particularly advantageous for an auxiliary device whose energy demand varies over time.

In an embodiment, the kitchen appliance is configured to output an information for a user if a complete processing of the recipe is not possible with the charging status of the auxiliary device or cannot be ensured. As described above, the case in which complete processing cannot be ensured includes in particular all cases in which complete processing is not possible or is critical. In this manner, the user himself can take measures to continue the food preparation process, such as for example loading the auxiliary device. This increases the reproducibility of the result.

In particular, the information for the user contains an indication that the auxiliary device needs to be charged. It may contain information about how long charging is required, so that the recipe can subsequently be prepared. Accordingly, the control unit may be configured to determine this information. Such an output occurs in particular after a use of the auxiliary device and/or with a temporal distance before an intended use of the auxiliary device. For example, a request may be output that the auxiliary device is to be connected to a power source for charging, possibly by bringing the auxiliary device into a charging position, for example in a charging station. Connecting to a power source comprises all technically available options for charging the battery including wireless charging. Alternatively, the information may include the indication that the battery of the auxiliary device is to be replaced.

In an embodiment, the kitchen appliance is configured to determine during a charging process whether the charging status is sufficient for a specific recipe step or for several specific recipe steps. If it is determined during charging, e.g. due to a change in the planned sequence of recipe steps, that a higher charging status is required than initially intended, a corresponding message can be output during charging.

If it is determined during charging that the time until the start of the planned use of the auxiliary device is not sufficient to reach a sufficient charging status, the planned use, for example the respective recipe step, can be postponed by the time difference, if applicable plus a buffer. As soon as the charging status is sufficient, a corresponding output can be provided to a user. Alternatively or additionally, the recipe step can be changed automatically. In particular, after each change to the recipe, it is determined again whether the recipe can be completely processed with the charging status of the auxiliary device.

In an embodiment, the kitchen appliance is configured to propose a modified or alternative recipe if complete processing of the recipe is not possible or cannot be ensured with the charging status of the auxiliary device. In particular, the kitchen appliance, typically the control unit, can access a variety of recipes and select a suitable recipe based on the charging status. Thus, the user can be actively guided to select a recipe that can be prepared with reproducible result. A modified recipe is in particular modified in such a manner that the time required for the preparation is shortened. The shortening may be limited to processes that require the use of the auxiliary device.

In a further embodiment, the kitchen appliance is configured to change a start time of a future process for preparing a food when it is determined that complete processing of the recipe is not possible or cannot be guaranteed with the charging status of the auxiliary device. In particular, a future process of the current recipe is meant. The change means, for example, a change with respect to a, preferably immediate, sequence of recipe steps predefined in the recipe.

The charging status of the auxiliary device is in particular the received charging status, i.e. the current charging status of the auxiliary device. Typically, the start time is postponed so that there is sufficient time to charge the auxiliary device. The change of the start time can be done by giving the user instructions to execute a process or a subsequent recipe step at a changed point in time. In an embodiment, the execution of at least one subsequent recipe step may be postponed. In an embodiment, a sequence of at least two subsequent recipe steps may be changed.

In particular, the kitchen appliance is configured to determine a duration of time required to increase the charging status of the auxiliary device such that complete processing of the recipe can be ensured. In particular, the kitchen appliance is configured to use the duration of time determined to modify the start time of the future process.

According to this embodiment, the control unit may determine, for example, that a charging process of eight minutes will enable a sufficient charging status of the thermometer for a subsequent cooking process. During the cooking process, an external thermometer is to be used to monitor the temperature inside a food. In this case, the kitchen appliance can postpone the cooking process by eight minutes so that a sufficient charging status of the thermometer can be achieved in the meantime.

In particular, the determination of whether complete processing of the recipe can be ensured with the charging status of the auxiliary device takes place before or during the food preparation process. In particular, the control unit is configured to determine the required time duration and/or to change the start time. This embodiment allows that a food preparation process can be automatically adapted when a charging status is not sufficient. In this case, too, thus a reproducible food preparation is made possible.

In a further embodiment, the kitchen appliance is configured to initiate a fast charging mode of the auxiliary device when it is determined that complete processing of the recipe is not possible or cannot be ensured with the charging status of the auxiliary device.

An instruction that the auxiliary device is to be connected to a power source for charging may be issued to the user so that the battery of the auxiliary device may be charged wired or wirelessly. In particular, in order to initiate the fast-charging mode, a corresponding command is sent to the auxiliary device and/or a charging station of the auxiliary device, so that the auxiliary device is fast charged in response to the command. The kitchen appliance may include a sending unit that can be used to send a corresponding command.

If the fast-charging mode is executed for the determined required time duration, a command for terminating the fast-charging mode and/or the charging can be sent to the auxiliary device and/or the charging station of the auxiliary device after the end of the determined time duration. Similarly, it is possible that the kitchen appliance again receives a charging status after the start of charging, in particular during charging, and compares it with the required charging status. Such an update can be performed at regular time intervals. Of course, this way of proceeding is also possible in a normal charging mode. As soon as the required charging status is reached, a corresponding information can be output to the user. In this way, the execution of the food preparation process can be continued immediately upon reaching the required charging status.

In particular, the kitchen appliance is configured to determine a duration of time required to increase the charging status of the auxiliary device such that complete processing of the recipe can be ensured. In this way, it is possible for the fast-charging mode to be executed for the determined period of time. Before the start of the charging process, an output to the user can be made that charging must be carried out for a specific duration of time. Thus, the user can be informed about the specific time duration.

This embodiment enables that the auxiliary device has a charging status sufficient for the operation at the time of its use. In this way, a failure is prevented and thus a particularly reproducible result of the food preparation is ensured.

In particular, the kitchen appliance comprises a sending unit coupled to the control unit, via which the information to be output to the user can be sent to a portable device such as a smartphone. This can be done alternatively or in addition to an output by means of an output unit of the kitchen appliance.

In a further embodiment, the kitchen appliance is configured to influence a processing of recipe steps based on the recipe and/or the received information. For example, the kitchen appliance may be configured to influence an operation of the tool and/or the heating element based on the recipe and/or the received information.

In an embodiment, the kitchen appliance is configured to influence an operation or a charging of the auxiliary device based on the recipe and/or the received information.

In particular, influencing the operation is done in such a way that the kitchen appliance sends a corresponding command to the auxiliary device or to the further appliance. For this purpose, it features in particular a sending unit. For example, the kitchen appliance may be configured to switch the auxiliary device to an energy-saving mode if it is not required in one or more following recipe steps. The kitchen appliance may be configured to convert the auxiliary device to normal operation when it is required in one or more following recipe steps. The normal operation may comprise the continuous or regular acquisition and/or transmission of data regarding the status information.

In an embodiment, the kitchen appliance is configured to influence an operation of the auxiliary device or another appliance based on the recipe and/or the received information.

In particular, the kitchen appliance is configured to influence the operation of the auxiliary device in dependence to the recipe. For example, at the beginning of a cooking process, an operating state of the auxiliary device can be activated, such that the auxiliary device receives and sends status information. Upon termination of the cooking process, for example, a standby mode may be activated. Likewise, it is possible that a normal charging or fast-charging mode is activated or deactivated by corresponding commands to the auxiliary device and/or a charging station of the auxiliary device.

In particular, the kitchen appliance is configured to influence the operation of at least one other appliance in dependence to the recipe. Thus, the kitchen appliance may give suitable commands prior to the start of a process. For example, a cooking process may be performed in a connected oven, and the kitchen appliance may give a command to preheat the oven at a suitable time beforehand. Alternatively or in a supplementary manner, changes to operating parameters may be made in this manner prior to and/or during the process.

The operation of further appliances can be influenced on the basis of the information received. For example, the following recipe steps can be postponed and/or their sequence changed. Likewise, the assignment of a process to a particular appliance can be changed. For example, a sauce can be kept warm in the food preparation vessel of the kitchen appliance instead of in the oven if the oven is needed for a cooking process that has been postponed.

In particular, the kitchen appliance may comprise a sending unit for sending commands for controlling a process to the auxiliary device and/or the further appliance. Sending commands to control a process means in particular sending control parameters and/or operating parameters, for example based on a recipe, to which the kitchen appliance has access. The auxiliary device and/or the further appliance then in particular has a corresponding receiving device for receiving the commands and/or a control unit for implementing the commands, i.e. for transmitting the corresponding operating parameters to at least one functional component of the auxiliary device and/or the further appliance, for example. For instance, the further appliance may be a further kitchen appliance, and the information may be such relating to a food preparation process of the kitchen appliance. Herein, the further appliance may feature, for example, a tool for mixing and/or comminuting a food in a food preparation vessel and/or a heating element for heating a food in the food preparation vessel. In particular, the kitchen appliance is configured to monitor and/or control the operation of the auxiliary device and/or the further appliance.

In a further embodiment, the kitchen appliance is configured to output information about how often a particular recipe can still be executed with the received charging status. In particular, the kitchen appliance is configured to access a multitude of digital recipes and to output information for several recipes, in particular for each of the recipes, about how often the respective recipe can still be executed with the received charging status. The kitchen appliance can be configured such that the user can select a recipe via an input unit and the information regarding this recipe is output with the output unit.

In an embodiment, the kitchen appliance is configured to propose one or more recipes that can still be executed with the received charging status. Thus, one or more recipes are suggested for which it is ensured that the corresponding one or more foods can be completed without having to recharge first.

Another aspect of the present disclosure is a system of a kitchen appliance for preparing a food in a food preparation vessel and a battery-operated auxiliary device. The kitchen appliance comprises a tool for mixing or comminuting the food in the food preparation vessel and/or a heating element for heating the food in the food preparation vessel. The kitchen appliance has a receiving unit for receiving a charging status of the battery-operated auxiliary device, and a control unit for processing the received charging status.

In particular, the kitchen appliance is configured to receive status information regarding food preparation from the battery-operated auxiliary device and to use it for a food preparation process. All features, embodiments and effects of the kitchen appliance described above also apply to the system accordingly.

In an embodiment of the system, the battery-operated auxiliary device is a thermometer. In particular, the thermometer is wirelessly connectable to the kitchen appliance. For this, a radio link such as Bluetooth can be used.

In an embodiment, the system comprises a charging station for charging the auxiliary device. In particular, the charging station comprises a receiving unit for receiving commands and a control device connected to the receiving unit for controlling a charging process of the auxiliary device. Said commands may be commands sent by a sending unit of the kitchen appliance for initiating a charging or a fast-charging mode of the auxiliary device.

A further aspect of the present disclosure is a method for operating a kitchen appliance. The kitchen appliance comprises a tool for mixing or comminuting the food in the food preparation vessel and/or a heating element for heating the food in the food preparation vessel. By means of a receiving unit of the kitchen appliance, a charging status of a battery-operated auxiliary device is received. By means of a control unit of the kitchen appliance, the received charging status is processed. In particular, the kitchen appliance is configured to receive status information regarding food preparation from the battery-operated auxiliary device and to use it for a food preparation process.

Another aspect of the present disclosure is a computer program product. This comprises commands which, when a computer executes a program of the computer program product, cause the computer to execute the steps of the method according to the previous claim. In particular, the computer may be a control device for controlling a kitchen appliance.

All features, embodiments and effects of the kitchen appliance described above as well as of the system apply to the method and to the computer program product accordingly.

The computer program product may be executed by a control device, in particular a control device for controlling a kitchen appliance. A control device is a preferably digital device for controlling. The control device may be a control unit comprised by the kitchen appliance according to previous aspects of the present disclosure. The control device may, however, be comprised by the auxiliary device or may be separate. For example, a portable device such as a smartphone may be used as the control device. It is sufficient if the control device is or can be brought into data connection with the auxiliary device in such a way that it can receive the charging status and, if applicable, the status information from the auxiliary device.

A further aspect of the present disclosure is a kitchen appliance having at least one functional component for preparing a food in a food preparation vessel. The kitchen appliance is configured to receive an information regarding a food preparation, in particular a measured temperature, from an auxiliary device, namely an external thermometer. The functional component is in particular a tool for mixing and/or comminuting a food in the food preparation vessel and/or a heating element for heating the food in the food preparation vessel. The kitchen appliance may comprise a receiving unit for receiving a charging status of a battery of the auxiliary device, and may in particular be configured to determine an information for proceeding with a food preparation process, taking into account the received charging status. All features, embodiments and effects of the kitchen appliance described above apply to this aspect of the present disclosure.

A further aspect of the present disclosure is a system of a kitchen appliance and an auxiliary device, namely an external thermometer. The kitchen appliance comprises at least one functional component for preparing a food in a food preparation vessel. The kitchen appliance is configured to receive an information regarding a food preparation, in particular a measured temperature, from the auxiliary device. The functional component is in particular a tool for mixing and/or comminuting a food in the food preparation vessel and/or a heating element for heating the food in the food preparation vessel. The kitchen appliance may comprise a receiving unit for receiving a charging status of a battery of the auxiliary device and, in particular, may be configured to determine information for continuing a food preparation process, taking into account the received charging status. All features, embodiments and effects of the kitchen appliance described above apply to this aspect of the present disclosure.

The invention claimed is:

1. A kitchen appliance, comprising:

a food preparation vessel for preparing food;

a rotatable tool having at least one blade for mixing or comminuting the food in the food preparation vessel;

an electric heater for heating the food in the food preparation vessel;

a battery-operated auxiliary device including a thermometer, the auxiliary device being configured to wirelessly send charging status of a battery of the auxiliary device;

a wireless Bluetooth receiver configured to receive status information regarding a food preparation process from the battery-operated auxiliary device, the status information including the charging status of the auxiliary device; and a control unit for controlling the rotatable tool and the electric heater, the control unit having a processor operably coupled to the wireless Bluetooth receiver and configured to process the received charging status such that the auxiliary device is wirelessly connected to the control unit, the process further configured to use the received charging status for preparing the food preparation process in the food preparation vessel by the rotatable tool and the electric heater, wherein the control unit is configured to access a digitally stored recipe, wherein the control unit is configured to one or more of (i) set at least one operating parameter of the tool or of the electric heater based on recipe steps of the digitally stored recipe and based on the received charging status of the auxiliary device, or (ii) adjust at least one recipe step of the digitally stored recipe based on the recipe steps of the digitally stored recipe and based on the received charging status of the auxiliary device.

2. The kitchen appliance of claim 1, wherein the control unit is configured to determine a remaining period of use of the thermometer of the auxiliary device based on the received charging status, and wherein the kitchen appliance is configured to output, via an output unit configured to output at least one of visual or auditory information, the remaining period of use to a user.

3. The kitchen appliance of claim 1, wherein the kitchen appliance is configured to set at least one operating parameter of the tool or of the electric heater based on recipe steps of a recipe and configured to output, via an output unit configured to output at least one of visual or auditory information, at least one information for a user based on the recipe steps of the recipe.

4. The kitchen appliance of claim 3, wherein the control unit is configured to determine whether the recipe can be completely processed based on the charging status of the thermometer of the auxiliary device, wherein the kitchen appliance is configured to output, via the output unit, corresponding information related to whether the recipe can be completely processed to a user.

5. The kitchen appliance of claim 4, wherein the control unit is configured to determine whether the recipe can be completed using the remaining charge of the thermometer of the auxiliary device by determining a remaining use period of the thermometer of the auxiliary device based on the received charging status signal, determining an expected use period of the thermometer of the auxiliary device based on a complete period of the recipe; and comparing the remaining use period of the thermometer of the auxiliary device and the expected use period of the thermometer of the auxiliary device.

6. The kitchen appliance of claim 4, wherein, in response to determining that complete processing of the recipe cannot be ensured based on the remaining charge of the thermometer of the auxiliary device, the kitchen appliance is configured to:

output, via the output unit, a notification to a user indicating that the complete processing of the recipe cannot be ensured.

7. The kitchen appliance of claim 6, wherein the kitchen appliance is configured to:

access a plurality of stored recipes;

identify, from the plurality of stored recipes, a modified or alternative recipe that can be completely processed based on the remaining charge of the thermometer of the auxiliary device; and the modified or alternative recipe to a user via the output unit.

8. The kitchen appliance of claim 4, wherein the kitchen appliance is configured to change a start time of a future process for preparing food in response to determining that complete processing of the recipe cannot be ensured with the charging status of the thermometer of the auxiliary device.

9. The kitchen appliance of claim 8, wherein the kitchen appliance is in particular configured to determine a period of time required to increase the charging status of the thermometer of the auxiliary device such that complete processing of the recipe can be ensured, and to use the determined period of time to change the starting time of the future process.

10. The kitchen appliance of claim 4, wherein the kitchen appliance is configured to initiate a fast-charging mode of the thermometer of the auxiliary device in response to determining that complete processing of the recipe cannot be ensured with the charging status of the thermometer of the auxiliary device, and wherein the kitchen appliance is in particular configured to determine a period of time for increasing the charging status of the thermometer of the auxiliary device such that complete processing of the recipe can be ensured.

11. The kitchen appliance of claim 1, wherein the kitchen appliance is configured to transmit a control signal to the auxiliary device to switch the auxiliary device between an active mode and a power-saving mode based on the recipe steps.

12. The kitchen appliance according to claim 1, wherein the kitchen appliance is configured to output, via an output unit configured to output at least one of visual or auditory information, information indicating how many times a given recipe can be completed using remaining charge of the battery based on the received charging status.

13. The kitchen appliance of claim 1, wherein the auxiliary device is a battery-operated thermometer, said thermometer being configured for measuring a temperature inside a food, said thermometer being configured for wireless connection with the kitchen appliance for communication.

14. The kitchen appliance of claim 1, further comprising:

a user interface including a touchscreen display, wherein the control unit is configured to output information to a user via the touchscreen display based on the received charging status.

15. The kitchen appliance of claim 1, wherein the control unit is further configured to:

determine a required charging status of the thermometer of the auxiliary device for processing a recipe by taking into account at least one recipe step of the recipe; and determine whether the recipe is completely processable by comparing the received charging status with the required charging status.

16. The kitchen appliance of claim 1, further comprising:

a sending unit coupled to the processor of the control unit and configured to wirelessly transmit control signals to the auxiliary device, wherein the control unit is configured to send a command via the sending unit to switch the auxiliary device between a normal operation mode and a power-saving mode.

17. The kitchen appliance of claim 1, wherein the processor is further configured to:

access a plurality of stored recipes;

determine, for each of the plurality of stored recipes, a number of times the respective recipe can be executed with the received charging status of the thermometer of the auxiliary device; and output information indicating the number of times each recipe can be executed via an output unit.

18. A kitchen appliance, comprising:

a food preparation vessel for preparing food;

a rotatable tool having at least one blade for mixing or comminuting the food in the food preparation vessel;

a thermometer configured to wirelessly send charging status of a battery of the thermometer;

a wireless Bluetooth receiver configured to receive status information regarding a food preparation process from the thermometer, the status information including the charging status of the thermometer; and a control unit for controlling the rotatable tool, the control unit having a processor operably coupled to the wireless Bluetooth receiver and configured to process the received charging status such that the thermometer is wirelessly connected to the control unit, the process further configured to use the received charging status for preparing the food preparation process in the food preparation vessel by the rotatable tool, wherein the control unit is configured to access a digitally stored recipe, wherein the control unit is configured to one or more of (i) set at least one operating parameter of the tool based on recipe steps of the digitally stored recipe and based on the received charging status of the thermometer, or (ii) adjust at least one recipe step of the digitally stored recipe based on the recipe steps of the digitally stored recipe and based on the received charging status of the thermometer.

* * * * *